United States Patent [19]

Chee et al.

[11] Patent Number: 4,600,619
[45] Date of Patent: Jul. 15, 1986

[54] CONTINUOUSLY WOUND FILAMENT STRUCTURE FOR USE IN NOISE ATTENUATION ELEMENT

[75] Inventors: Wan T. Chee; George W. Quigley, both of Bellevue, Wash.

[73] Assignee: The Boeing Company, Seattle, Wash.

[21] Appl. No.: 687,905

[22] Filed: Dec. 31, 1984

[51] Int. Cl.[4] .................................................. B32B 3/12
[52] U.S. Cl. .................................... 428/118; 156/173; 156/292
[58] Field of Search ................ 428/73, 116, 131, 117, 428/118; 156/173, 197, 292

[56] References Cited

U.S. PATENT DOCUMENTS

| | | | |
|---|---|---|---|
| 2,992,673 | 7/1961 | Bishop | 156/197 X |
| 3,021,241 | 2/1962 | Schneiderman et al. | 156/173 |
| 3,211,253 | 10/1965 | Gonzalez | 428/116 X |
| 3,300,354 | 1/1967 | Duft | 428/116 X |
| 3,481,427 | 12/1969 | Dobbs et al. | 428/116 X |
| 3,502,171 | 3/1970 | Cowan | 428/116 X |
| 3,617,416 | 11/1971 | Kromrey | 156/173 |
| 3,645,833 | 2/1972 | Figge | 428/116 X |
| 3,670,843 | 6/1972 | Kelly et al. | 428/116 X |
| 3,700,067 | 10/1972 | Dobbs et al. | 428/116 X |
| 3,756,346 | 9/1973 | Parker | 428/120 X |
| 3,767,499 | 10/1973 | Koss | 428/116 X |
| 3,960,236 | 6/1976 | Holmes | 428/116 X |
| 4,052,523 | 10/1977 | Rhodes et al. | 428/116 |
| 4,053,667 | 10/1977 | Smith | 428/116 X |
| 4,111,081 | 9/1978 | Hilliard et al. | 428/116 X |
| 4,244,994 | 1/1981 | Trainor et al. | 428/37 |

FOREIGN PATENT DOCUMENTS

EP0038746A1  11/1982  European Pat. Off. ............ 428/116

*Primary Examiner*—Henry F. Epstein
*Attorney, Agent, or Firm*—Christensen, O'Connor, Johnson & Kindness

[57] ABSTRACT

An engine inlet sound diffusion structure for use with a turbofan engine is constructed of nonmetallic composite materials. An inner perforated skin of the diffuser is made up of continuously wound composite material filaments. A honeycomb core is sandwiched between the inner porous skin and a nonporous outer skin also comprised of continuously wound filaments. The perforations in the inner skin are formed directly in the skin by programmed placement of the filaments during the winding process. The formation of the perforations can be assisted by the use of a mandrel having spikes formed on its outer surface.

6 Claims, 4 Drawing Figures

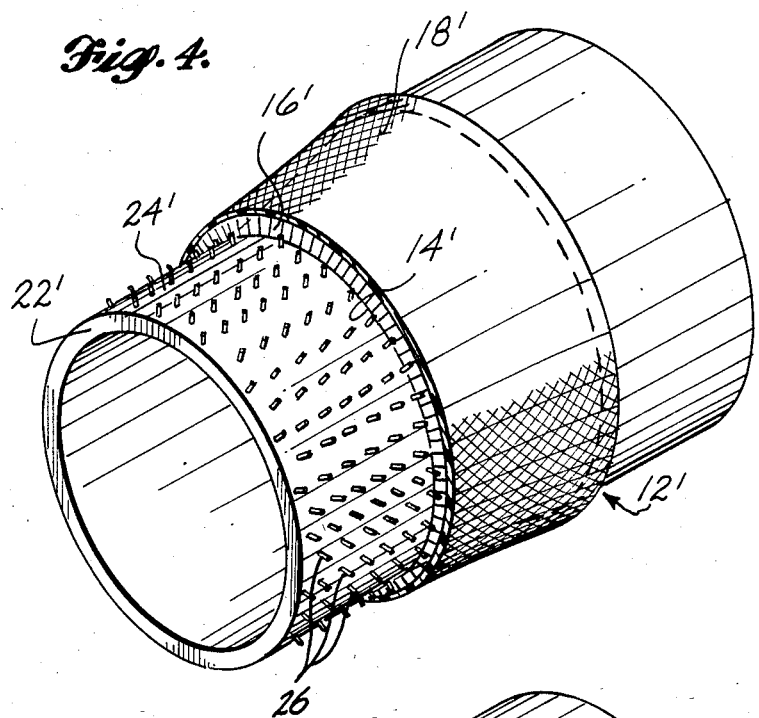
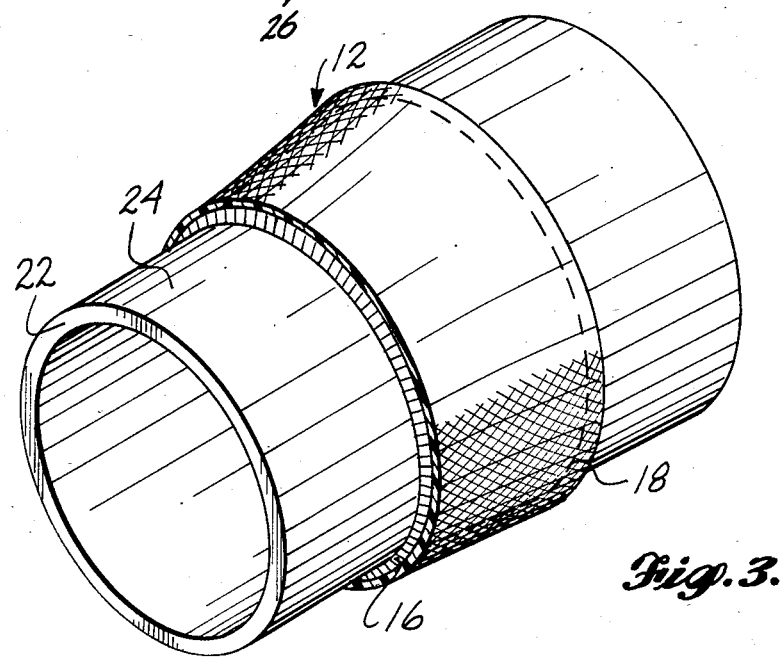

CONTINUOUSLY WOUND FILAMENT STRUCTURE FOR USE IN NOISE ATTENUATION ELEMENT

BACKGROUND OF THE INVENTION

This invention relates to composite structures and, more particularly, to structures manufactured by the continuously wound filament technique. The invention further relates to a structure of the type described that is useful in the attenuation of noise in the intake of a conventional turbofan engine.

All modern jet engines incorporate acoustic treatment structure in the engine inlet. Conventionally, these elements are made with an inner perforated skin, a surrounding buried-septum honeycomb core, and a solid outer skin. The two skins are typically metal, usually aluminum, and the honeycomb core can either be aluminum or some composite material.

An aluminum perforated skin is subject to corrosion problems and also manufacturing problems in that the skin is originally manufactured as a solid aluminum sheet and then must be perforated prior to assembly with the core to make up the acoustic honeycomb panel. For both corrosion-resistance and weight considerations, it is desirable to utilize nonmetallic composite materials for the acoustic treatment panel; however, the typical woven composite sheet of graphite and some man-made material such as an aramid, for example, Kevlar, has the disadvantage that the solid sheet of composite material does not lend itself to easy perforation. The material tends to splinter when punched and drilling is a time-consuming procedure.

Therefore, it is an object of the present invention to provide an acoustic treatment structure manufactured from composite nonmetallic materials that is both lightweight and easy to manufacture when compared with conventional metallic acoustical treatment panels.

SUMMARY OF THE INVENTION

In order to address some of the concerns noted above, the present invention provides an acoustic treatment structure that can be used to line the interior of the inlet of a turbofan engine that comprises a porous inner face sheet made of continuously wound nonmetallic fibers. A honeycomb core of either metallic or nonmetallic material is bonded to the porous inner face sheet and a nonporous outer skin of continuously wound nonmetallic fibers is bonded to the honeycomb core.

The inner face sheet is preferably wound upon a mandrel so that the sheet as produced is of the proper shape to line the turbofan engine inlet. The filament-winding apparatus is configured so that the windings leave a perforated pattern. Alternatively, it is possible to provide the mandrel with spikes or other projections extending from its outer surface such that the inner face sheet is wound upon the spiked surface. When the face sheet is removed from the mandrel, voids will remain where the spikes of the mandrel were located.

The size of the apertures and their precise shape are a function of the design requirements of a given application. It is possible to add additional perforated, continuously wound filament face sheets and layers of honeycomb core material prior to wrapping the entire structure with the nonporous filament-wound outer skin to produce a multilayer acoustic treatment panel that essentially contains a buried perforated septum comprised of the filament-wound porous intermediate face sheets.

BRIEF DESCRIPTION OF THE DRAWINGS

The invention herein will be better understood by those of ordinary skill in the art and others upon reading the ensuing specification taken in conjunction with the appended drawings wherein:

FIG. 3 is an isometric view of a mandrel upon which an acoustic treatment structure is being constructed in accordance with the principles of the present invention; and FIG. 4 is an isometric view of an alternative mandrel upon which an acoustic treatment structure is being constructed in accordance with the principles of the present invention.

DETAILED DESCRIPTION OF THE PREFERRED EMBODIMENT

Figure 1:
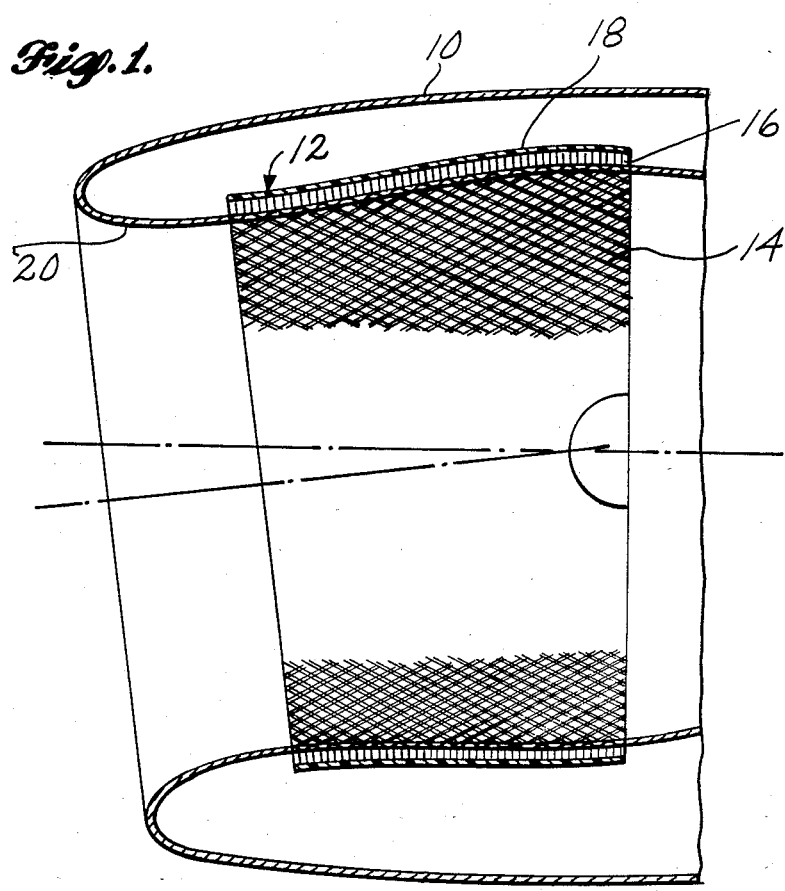
FIG. 1 is a side elevational view in section of the inlet of a typical turbofan engine having an acoustic treatment material made in accordance with the principles of the present invention mounted therein.

A cross section of a typical turbofan engine inlet is pictured in FIG 1. In order to reduce the engine noise, it has been found desirable to line the interior of the inlet with a sound-absorbent structure 12. In order for the structure 12 to absorb sound correctly, it is necessary that the innermost skin 14 of the structure be perforated to allow the passage of sound waves into the interior of the sound-absorbing structure. A honeycomb core panel 16 containing a series of compartments or cells lies directly underneath the perforated skin 14 and sound waves passing through the perforations in the outer skin 14 are essentially trapped within the honeycomb cells. The opposite side of the honeycomb core 16 is covered by a nonporous outer skin 18 that in turn is bonded to the interior surface 20 of the engine inlet.

Figure 2:
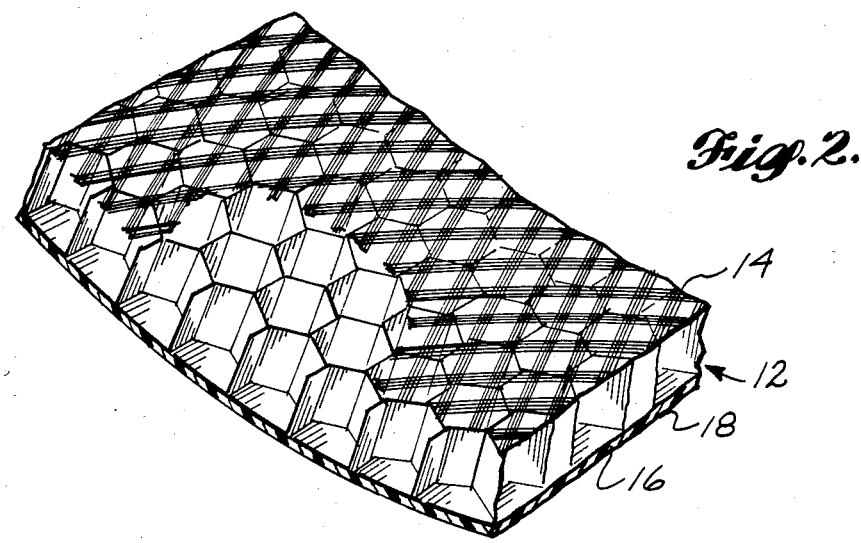
FIG. 2 is an isometric view of a section of the acoustic treatment panel made in accordance with the principles of the present invention.

FIG. 2 shows an enlarged section of the acoustic treatment panel 12 that lines the interior of the engine inlet shown in FIG. 1. The honeycomb core 16 can be made of any of a number of conventional materials. One typical core material is aluminum; however, nonmetallic materials are also available, such as Nomex. One of the unique features of the acoustic treatment structure of the present invention is that the inner skin 14 covering the honeycomb core 16 is manufactured by filament winding continuous filaments of material. By using the filament-winding process, the inner skin 14 can be constructed to contain openings or perforations in a pattern and size as determined necessary to achieve the proper noise control in a given inlet. As was discussed earlier, the conventional method of manufacturing the inner skin is to form a solid sheet of aluminum and then produce holes in the aluminum panel, either by drilling or punching. Since, in the filament-winding construction of the inner skin 14 used in the present invention, the perforations can be manufactured directly in the skin as it is being formed, the number of steps in the construction process is reduced. Also, only the material needed to make the panel, including perforations, is used, instead of the excess material that is used in the normal process, whereby a solid sheet is made and then material is removed to form the perforations.

In manufacturing the structure shown in FIGS. 1 and 2, typically, a mandrel of the shape desired has the inner skin wound directly onto it. such a mandrel 22 is shown in FIG. 3. Typically, the fibers are wound at some angle between zero and 90 degrees, with respect to the axis of the mandrel and are wound at plus-or-minus that given angle as the rovings are wound back and forth across the surface of the mandrel 22. After the inner skin has been wound, the honeycomb core material is laid over the mandrel on top of the inner skin and secured to it by some adhesive. The outer nonporous skin 18 is then wound over the honeycomb core so that the sandwiched honeycomb panel is formed on the same mandrel 22. After completion of the structure, the mandrel 22 is removed, leaving the formed acoustic treatment liner 12 for the engine inlet ready to install.

The mandrel 22 has a smooth exterior surface 24 and the perforations in the inner skin 14 are formed by the winding pattern programmed into the winding apparatus. An alternative mandrel 22' is shown in FIG. 4. The mandrel 22' has a plurality of spikes or pins 26 protruding from its exterior surface 24' so that the winding that forms the inner skin 14' is wound on the low spots of the mandrel surface 24', leaving the pins 26 to form openings in the skin 14' as it is being wound. The pins 26 protrude only a short distance from the surface 24' of the mandrel 22' so that they properly form the openings in the inner skin 14' but do not interfere with placement of the honeycomb core 16' over the inner skin 14' after it is wound. Another consideration, when using the mandrel 22' having pins 26 protruding from its surface 24', is removal of the mandrel 22' after completion of the acoustic treatment structure 12'. The pins 26 prevent the mandrel 22' from being slid out from the interior of the cylindrical structure 12'. Therefore, it is necessary that the mandrel 22' somehow be collapsible so that the surface 24' of the mandrel 22' moves radially with respect to the structure 12' to first free the pins 26 from the structure 12'. Then the mandrel 22' can be moved longitudinally out from the center of the structure 12'.

While the pictured acoustic treatment panel of FIGS. 1 and 2 has a single layer of honeycomb core 16 sandwiched between a perforated inner skin 14 and a solid outer skin 18, it would be possible to provide more layers of honeycomb core and perforated skin to produce what is known in the art as a "buried septum" design acoustic treatment panel, having perforated skin on the interior surface and another perforated skin located between layers of honeycomb panel in the interior of the structure. The precise construction of any of the acoustic treatment panels is determined by the sound-absorbing requirements of a particular situation.

One suitable construction of a honeycomb core acoustic treatment structure according to the present invention consists of a porous inner skin wound of Kevlar aramid filaments in a wet winding process with an epoxy resin. The core was a low-density aluminum flex-core and a solid outer skin of graphite filaments in an epoxy resin was wound over the flex-core. The actual winding was accomplished using a numerically controlled McClean-Anderson filament-winding machine and an aluminum lay-up mandrel. The inner skin consisted of one ply of Kevlar wound at ±30 degrees. The Kevlar was wet wound using three tows of 380 denier Kevlar, and an epoxy resin. A controlled spacing of 0.060 inches between adjacent tows was provided to produce the desired perforations. After completion of winding, the inner skin was cured at 250 degrees F. The aluminum flex-core was reticulated with adhesive and positioned on the inner skin. Adhesive was then applied to the exposed core surface and the outer skin was wound in place. The outer skin was comprised of a filament winding of eight plys, three at 90-degree orientation, two plys at ±45 degrees, and three more plys at 90-degree orientation, using 12 tows of Union Carbide 3k graphite fiber and an epoxy resin. The inner core, aluminum flex-core, and outer skin were co-cured at 325 degrees F. While the sample was wet wound, it would be possible to utilize preimpregnated filaments. The use of preimpregnated filaments would produce a more accurate control of the winding and spacing of the perforated inner skin since resin placement would be more controlled. However, the cost of the preimpregnated material would increase substantially over the wet-wind process. The composite material diffuser inlet of the present invention could have a considerable weight savings in a given aircraft and provides for a strong reliable product that can be manufactured at a reasonable cost. The weight savings in a four-engine aircraft like the Boeing 747 could be as much as 200 pounds per airplane. The use of the filament-winding process also allows the perforations in the inner skin of the acoustic element to be shaped and sized precisely without the need for expensive drills or punches.

While a preferred embodiment of the present invention has been described and illustrated herein, it should be understood that changes can be made to the embodiments described herein while remaining within the scope of the present invention. Therefore, the invention should be defined solely by reference to the claims that follow.

The embodiments of the invention in which an exclusive property or privilege is claimed are defined as follows:

1. An acoustic treatment structure for use in the inlet of a turbofan engine formed by the process of filament winding an inner porous skin over a mandrel shaped to substantially conform to the inner shape of the turbofan inlet, said mandrel having pins protruding from the surface thereof, said pins being of a length greater than the thickness of said inner skin, said filaments of said inner skin filling the spaces between said pins such that said inner sheet contains perforations corresponding to the locations of said pins upon removal from said mandrel, placing a preformed honeycomb core panel over said inner skin, said pins of said mandrel being of a length less than the thickness of said honeycomb core panel, and filament winding a nonporous outer skin over said honeycomb core panel while in place over said mandrel.

2. The acoustic treatment structure of claim 1, wherein said fibers of said face sheet are aramid.

3. The acoustic treatment structure of claim 1, wherein said honeycomb core is made of aluminum.

4. The acoustic treatment panel of claim 1, wherein said honeycomb core is made of nonmetallic material.

5. The method of making an acoustic treatment panel for use in the inlet of a turbofan engine comprising the steps of:
 filament winding a porous inner skin over a mandrel shaped to conform to the inner shape of said turbofan inlet, said mandrel having pins extending radially therefrom, said filament windings filling the spaces between said pins, said pins, being of a length longer than said inner skin thickness;

placing a honeycomb core panel over said inner skin and bonding said honeycomb core panel to said inner skin on said mandrel, the cells of said honeycomb core panel being arranged so that said pins lie inside said cells, said pins being shorter than the thickness of said honeycomb panel;

filament winding a nonporous outer skin over said honeycomb panel while said panel is in place on said mandrel;

removing said mandrel from the structure formed in the preceding steps.

6. The method of claim 5 further including the step of centering the honeycomb core panel on the mandrel so that said pins are substantially in the centers of their associated cells.

* * * * *